May 20, 1924.
J. JOHNSTON
HUMIDITY REGULATOR
Filed Dec. 10, 1921
1,494,551
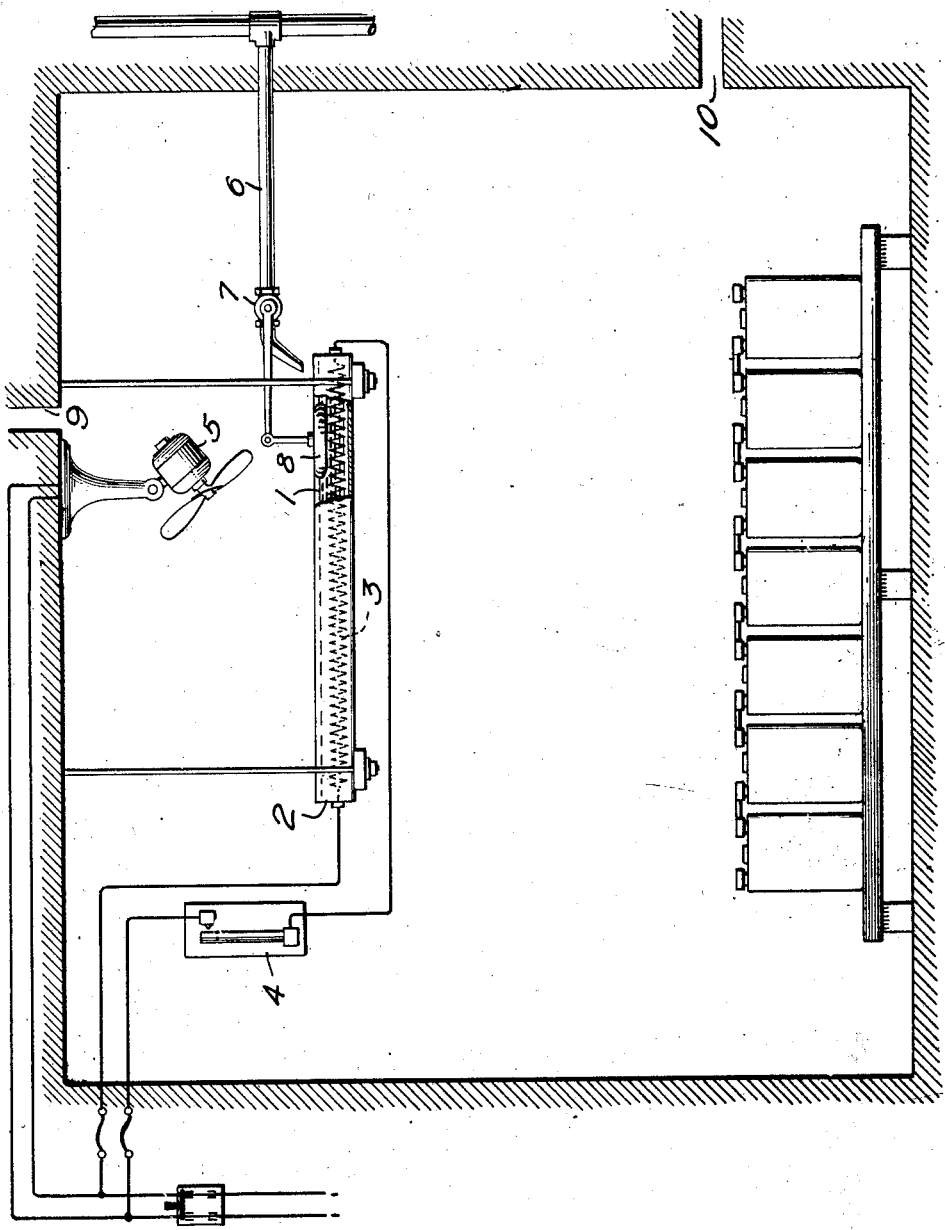
Inventor
John Johnston Patented May 20, 1924.

1,494,551

UNITED STATES PATENT OFFICE.

JOHN JOHNSTON, OF NEW HAVEN, CONNECTICUT, ASSIGNOR TO WESTERN ELECTRIC COMPANY, INCORPORATED, OF NEW YORK, N. Y., A CORPORATION OF NEW YORK.

HUMIDITY REGULATOR.

Application filed December 10, 1921. Serial No. 521,313.

*To all whom it may concern:*

Be it known that I, JOHN JOHNSTON, a citizen of the United States, residing at New Haven, in the county of New Haven, State of Connecticut, have invented certain new and useful Improvements in Humidity Regulators, of which the following is a full, clear, concise, and exact description.

This invention relates to humidity regulators.

An object of the invention is to provide means whereby the vapor pressure of the moisture contained in an enclosed area or space may be held at a constant value although moisture is continuously being transferred from or to the air in said space and whereby the content of water in an aqueous solution, which is subject to change in concentration, may be kept within narrow limits.

The drawing illustrates this invention as applied to preventing loss of water from storage battery solutions.

In storage battery units such as those employed in telephone central offices, considerable difficulty has been experienced in maintaining the solutions contained in the batteries at the desired concentration. There are three factors involved, which should be taken into consideration in the operation of a storage battery:

1. The loss of water from the battery solution caused by evaporation.
2. The loss of water caused by the electrolytic decomposition thereof.
3. The progressive dilution of the battery solution on discharging, and a proportional increase in concentration on charging, resulting from the removal or addition of sulphate ions at the negative electrode.

Through the operation of the proposed means, which form the basis of the present invention, the concentration of the battery solution for a given condition of charge or discharge, may be maintained within any desired limits.

The drawing shows a saturated salt solution 1, such as a saturated solution of sodium chloride, preferably having a large exposed surface, contained in a vessel 2. This may be suspended from the ceiling of the battery room or placed in any other desired location. Within or beneath this vessel, heating means 3, equipped with a thermostat 4 may be placed. To circulate the air over the surface of the saturated solution, an electric fan 5 may be placed at some point near the solution, preferably extending over it as shown in the drawing. A water supply 6 equipped with a valve 7, which may be regulated by a float 8, may be provided to return to the salt solution the water lost by it through evaporation.

To ventilate the room, an opening 9 may be made in such a position that the air will be blown by the fan 5 directly over the solution. In this case, there should be an opening 10 in the walls of the room to allow the air to escape therefrom.

The vapor pressure of the battery solution ordinarily corresponds to approximately 75 per cent saturation of the atmosphere with water vapor, and a solution saturated with sodium chloride gives a vapor pressure which corresponds to about 75 per cent saturation. If it is desired, therefore, to prevent loss of water through vaporization from the battery solution, or to compensate for loss of water through the decomposition thereof, the thermostat 4 should be set so that the relative humidity of the air near the surface of the battery solution will be within the limits set as desirable for the normal vapor pressure of the battery solution. To accomplish this, it will be necessary for the saturated salt solution to have a vapor pressure sufficiently above that of the battery solution to overcome the resistance of the air between the two solutions. In order to partially overcome this air resistance, the fan 5 may be set in motion to circulate the water vapor from the salt solution about the room. By sufficiently increasing the rate of circulation of the air in the room, this air resistance can be reduced almost to zero. The thermostat 4 may be set to raise the temperature of the saturated salt solution so as to give it the required constant vapor pressure.

In setting the thermostat, the third factor must be taken into consideration; namely, the decrease or increase in the concentration of the battery solution caused by the loss of sulphate ions on discharging, and their addition on charging; and the corresponding increase or decrease, respectively, in vapor pressure of the battery solution. As this charging or discharging process is going in one direction or the other most of the time, it will ordinarily be sufficient to regulate the temperature of the saturated salt solution so that the concentration of the battery solution would remain constant, were the battery solution at its mean normal position between charge and discharge.

While this invention has been more particularly described in connection with stationary batteries, such as used in telephone central offices, it may be applied to the ordinary portable storage batteries by placing about the cell a solution saturated with a suitable salt to give the desired vapor pressure.

A saturated solution has been specified, as it is apparent that such a solution is the most convenient to use since its vapor pressure is unchanged by loss of water through evaporation. It is obvious, however, that if the cycle of changes through which the water must pass, i. e., from the salt solution to the air and from the air to the battery solution, is determined by experiment, the salt solution may be kept at any concentration, which will produce the required effect.

While a solution of sodium chloride has been specified, because if its cheapness, as a desirable salt to use, an aqueous solution of any other salt may be used for the purposes of this invention, provided that it has a proper vapor pressure. In any given case the choice of a salt whose saturated aqueous solution has the vapor pressure appropriate to the particular condition, will enable the thermostat to be dispensed with.

One of the advantages of this invention is the fact that no supply of distilled water nor any apparatus for producing it need be maintained. The water flowing into the saturated salt solution may be ordinary tap water, for, as it is converted into vapor before its introduction into the battery solution, it is thereby automatically freed from any impurities which would be harmful to the battery.

In some cases it might be desirable to allow evaporation of water from the battery cell to take place, but on account of the presence of other apparatus in the battery room, it might be necessary to provide means to prevent the condensation of moisture upon such apparatus. In order to accomplish this, it is necessary to maintain a salt solution at a vapor pressure low enough to prevent condensation of water in any part of the room. In this case, a considerable quantity of the undissolved salt might be kept in thorough contact with the solution to prevent dilution thereof.

While the invention has been described as applicable particularly to storage batteries, it is evident that the principle underlying the present invention may be extended to include cases where the battery is replaced by a reservoir of a particular solution which is subject to loss or absorption of water; and the maintenance within the room of a salt solution with a constant vapor pressure will afford a means for regulating the humidity of the air in the room.

The invention claimed is:

1. The method of preventing loss of water from storage battery solutions, which consists in maintaining in an enclosed space with the storage batteries an aqueous solution saturated with a soluble salt and having at a given temperature a slightly higher vapor pressure than that of the battery solution.

2. The method of maintaining constant the concentration of an aqueous solution, which consists in providing in an enclosed space therewith a second aqueous solution, and in maintaining the second solution at a predetermined temperature and degree of concentration.

3. In combination, a battery cell, an electrolyte contained therein, and means for maintaining constant the concentration of the electrolyte.

In witness whereof, I hereunto subscribe my name this 8th day of December A. D., 1921.

JOHN JOHNSTON.